United States Patent [19]
Kazami

[11] Patent Number: 5,864,751
[45] Date of Patent: Jan. 26, 1999

[54] SYSTEM FOR PROGRAMMING A RADIO RECEIVER

[75] Inventor: Koichi Kazami, Tokyo, Japan

[73] Assignee: General Research of Electronics, Inc., Tokyo, Japan

[21] Appl. No.: 664,572

[22] Filed: Jun. 14, 1996

[51] Int. Cl.[6] ........................................................ H04B 1/18
[52] U.S. Cl. ................................... 455/161.2; 455/154.2; 340/825.22
[58] Field of Search ............................ 455/161.2, 161.1, 455/154.2; 340/825.22, 825.5, 825.83

[56] References Cited

U.S. PATENT DOCUMENTS

| | | | |
|---|---|---|---|
| 4,753,515 | 6/1988 | Sato et al. ................................. | 350/320 |
| 5,163,161 | 11/1992 | Bowles et al. .......................... | 455/166.1 |
| 5,398,276 | 3/1995 | Lemke et al. ........................... | 455/33.1 |
| 5,451,839 | 9/1995 | Rappaport .............................. | 455/67.1 |

*Primary Examiner*—Donnie L. Crosland
*Attorney, Agent, or Firm*—Trexler, Bushnell, Giangiorgi & Blackstone, Ltd.

[57] ABSTRACT

A novel apparatus is provided for facilitating the transfer of signals from a computer for the external setting of reception frequency parameters and other operating conditions of a radio receiver having a memory which is programmable according to data in the form of an electric pulse signal. The apparatus includes an interface circuit operatively coupled between the computer and the memory of the receiver. The interface circuit converts respective signal levels of the data into the electric pulse signals enabling data transfer and communication between the computer and the memory of the receiver. An improved flat-type, reversible connector is used between the interface circuit and the receiver. The connector has upper and lower surface portions, and is operatively coupled to a receptacle in the receiver. The connector has pairs of vertical connector conductors, each individual vertical conductor of each pair being connected to each other, within the respective surface portions and are arranged so that the mutually connected pair of conductors are positioned at both sides of a center conductor. The receptacle has contacts adapted to simultaneously contact the conductors on either of the surface portions of the connector, respectively. The contacts of the receptacle are connected in the same manner as the conductors of the connector, wherein the connector can be inserted into and connected to the receptacle in a reversible manner.

20 Claims, 4 Drawing Sheets

SYSTEM FOR PROGRAMMING A RADIO RECEIVER

BACKGROUND OF THE INVENTION

The present invention presents a novel system for setting reception frequency parameters and the like of a radio receiver. More particularly, the present invention relates to a novel system for externally setting reception frequency parameters and other operating conditions of a radio receiver, such as a scanner, without the need for, or the use of, reception frequency parameter and other operation conditions setting circuits within the scanner.

In a typical scanner, which can scan and receive a plurality of selected frequencies, the setting of the reception frequencies and other operating conditions is usually performed within the physical structure of the scanner itself, requiring an additional circuit for programming the reception frequencies, etc., in addition to a circuit for performing the primary receiver function of the scanner. As a result, the cost of such scanner is necessarily increased by the additional circuitry required, and further adding to an overall limitation in the desired miniaturization of the scanner configuration.

The present invention overcomes the shortcomings of the prior art by providing a novel system in which data for setting the reception frequency parameters of the scanner is inputted from an external data source into the scanner, this data is then written into a memory of the scanner providing operating reception frequency parameters, etc., to the scanner. Therefore, by utilizing this novel system, the need for the provision of such reception frequency parameter, etc., setting (i.e., "programming") circuit within the scanner itself is eliminated.

Another problem arises, however, pertaining to the connection device utilized for the connection of the external data source to the scanner. A usual connector for an electrical connection of the external data source to the scanner brings about a sacrifice for a degree of freedom in design relating to the outer casing of a miniaturized scanner, as well as necessity for special attention to the connection of the connector of the external data source to the connector of the scanner.

In order to remedy the connection device problem, the novel system of the present invention utilizes a reversible connector arrangement which is suitable for use in a miniaturized scanner. The reversible connector provides an easy to use and simple connection between the external data source and the scanner without the need for any additional apparatus or special attention as to use. This reversible connector provides simple insertion and connection to a scanner receptacle with no sacrifice of a degree of freedom in design for the outer case or configuration of the miniaturized scanner.

Furthermore, it is preferable to use a conventional personal computer, as means for programming and operating the scanner, because no special apparatus need be developed in conjunction with the computer for that purpose.

The present invention allows for the desired overall miniaturization of the scanner's configuration, while simultaneously negating the need for the provision of reception frequency parameter setting circuits within the scanner. Additionally, the computer requires no special apparatus to be developed for use in conjunction with the system, resulting in a convenient, compact, easy to use miniaturized scanner at a lower cost.

OBJECTS AND SUMMARY OF THE INVENTION

A general object of the present invention is to provide a novel and improved radio receiver.

A more particular object is to provide a system for externally programming of the radio receiver.

An additional object is to provide a radio receiver which is compact or miniaturized in configuration, while simultaneously simplifying the design and reducing the cost of such radio receiver.

Yet a further object is to provide an efficient and compact electrical connection between an external data source and the radio receiver without sacrificing the degree of freedom relating to radio receiver outer casing design.

Briefly, and in accordance with the foregoing, the present invention discloses a novel system for externally programming a radio receiver, utilizing an external data source. The radio receiver can be a scanner with a memory having the ability to scan a plurality of frequencies set in the memory, while the external data source can be a computer.

The computer generates and sends data signals or programs as reception frequency parameters for use in the scanner, according to a preprogrammed protocol. Additionally, the computer may also serially receive, and allow editing of, the data or program stored in the memory of the scanner.

An interface circuit is connected between the scanner and the computer allowing for a data communications link between the computer and the memory of the scanner. The interface circuit converts the data signals generated in the computer from a signal level into electric pulse signals which are suitable to write a program into the memory of the radio receiver. Conversely, the interface circuit is capable of converting the signal level of the data read out from the memory of the scanner into electric pulse signals which are suitable to be received by the computer through the interface circuit.

The interface circuit may further include a feedback circuit. The feedback circuit provides information to the computer concerning the operating status of any utilization device connected to the computer, or whether there is any utilization device connected to the computer.

A reversible connector, in the form of a flat-type connector, is adapted for connection or insertion into a receptacle located on the scanner, enabling the computer to communicate with the scanner memory through the interface circuit. The connector is comprised of respective surface portions, a front and a back surface portion, containing corresponding pairs of vertical conductors located in and/or on the connector itself, with individual vertical conductors of each pair of vertical conductors being mutually connected to each other. The individual vertical conductors on the respective surface portion of the connector are arranged in such a manner that the vertical pair of conductors are positioned at the both sides of a center conductor.

Additionally, the vertical conductors on the respective surface portion of the connector may be arranged so that a first pair of the vertical conductors, which are mutually connected, are positioned at the both sides of the center conductor, and a second pair of the conductors, which are also mutually connected, are positioned between the first pair of conductors and the center conductor, respectively.

The receptacle of the scanner has contacts adapted to simultaneously contact the vertical conductors on either surface portion of the connector, respectively. The receptacle of the scanner has upper contacts adapted to simultaneously contact the vertical conductors on the upper surface portion of the connector, respectively, and lower contacts adapted to simultaneously contact the vertical conductors on the lower surface portion of the connector, respectively. The contacts of the receptacle being connected in the same manner as in the vertical pair of conductors of the connector, wherein the connector can be inserted into and connected to the receptacle in a reversible manner.

Transmitter data (TXD) from the computer may be applied to the conductor pairs positioned at the both sides of the center conductor located on the connector, the center conductor of which may carry ground (GRD) data.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
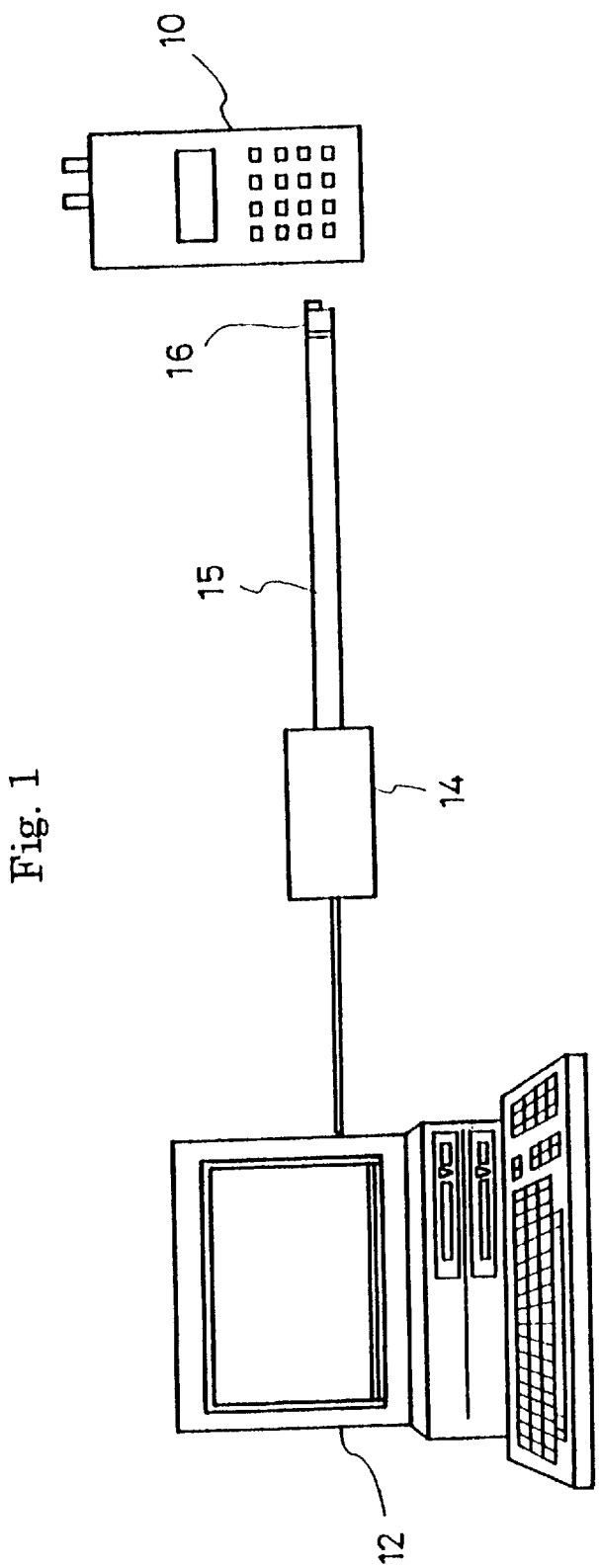
FIG. 1 shows a system of the present invention in which data relating to reception frequency parameters is transmitted from a computer to a scanner receiver through an interface circuit in conjunction with a special connector arrangement.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention relates to a novel system for externally setting reception frequency parameters (and/or otherwise programming or operating) of a radio receiver or scanner 10 utilizing an external data source, such as a personal computer 12, in conjunction with an interface circuit 14, which allows for communication between the computer 12 and the scanner 10.

In accordance with this invention, FIG. 1 illustrates a system construction in which data for the setting of reception frequency parameters for the scanner 10 is supplied from the external personal computer 12 to the scanner 10, and data set in the scanner 10 is transmitted from the scanner 10 to the personal computer 12. The personal computer 12 may be an IBM-PC/AT or AT compatible personal computer which runs under a general purpose operating system, such as DOS. The computer 12 shown usually includes a computer main body with a CPU, a hard disk and floppy disk drives, etc., as well as, a key board and a display. Normally, the personal computer 12 also includes a serial data interface port, such as an RS-232 port, for receiving and transmitting data.

Figure 2:
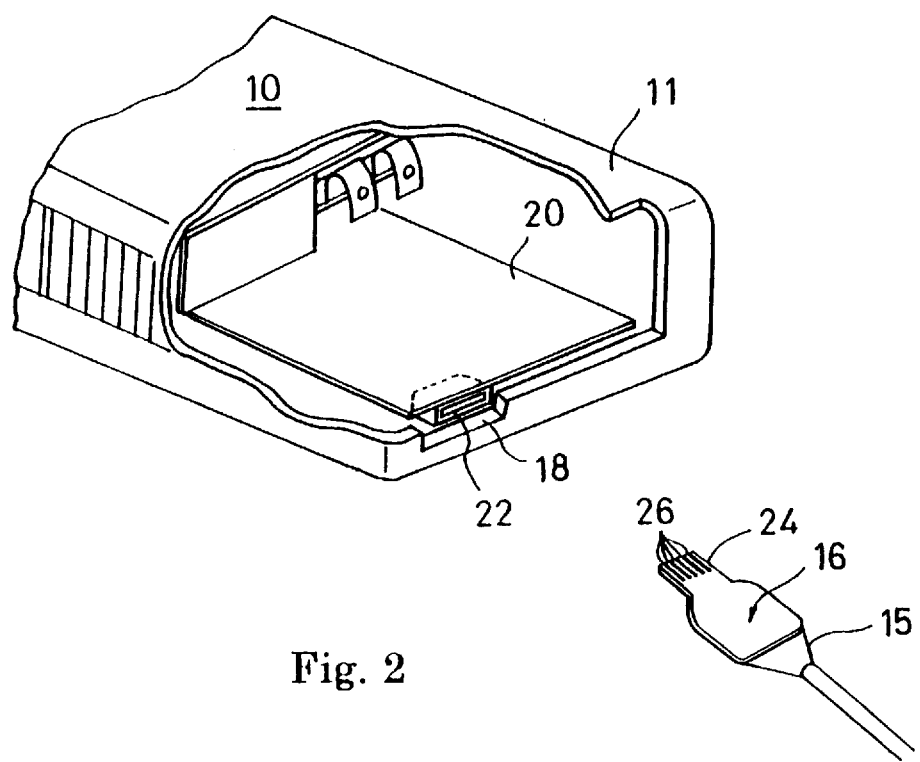
FIG. 2 is a perspective view of a reversible connector with the scanner partially broken out, illustrating a manner in which the reversible connector is inserted into and connected to the scanner.
Figure 3:
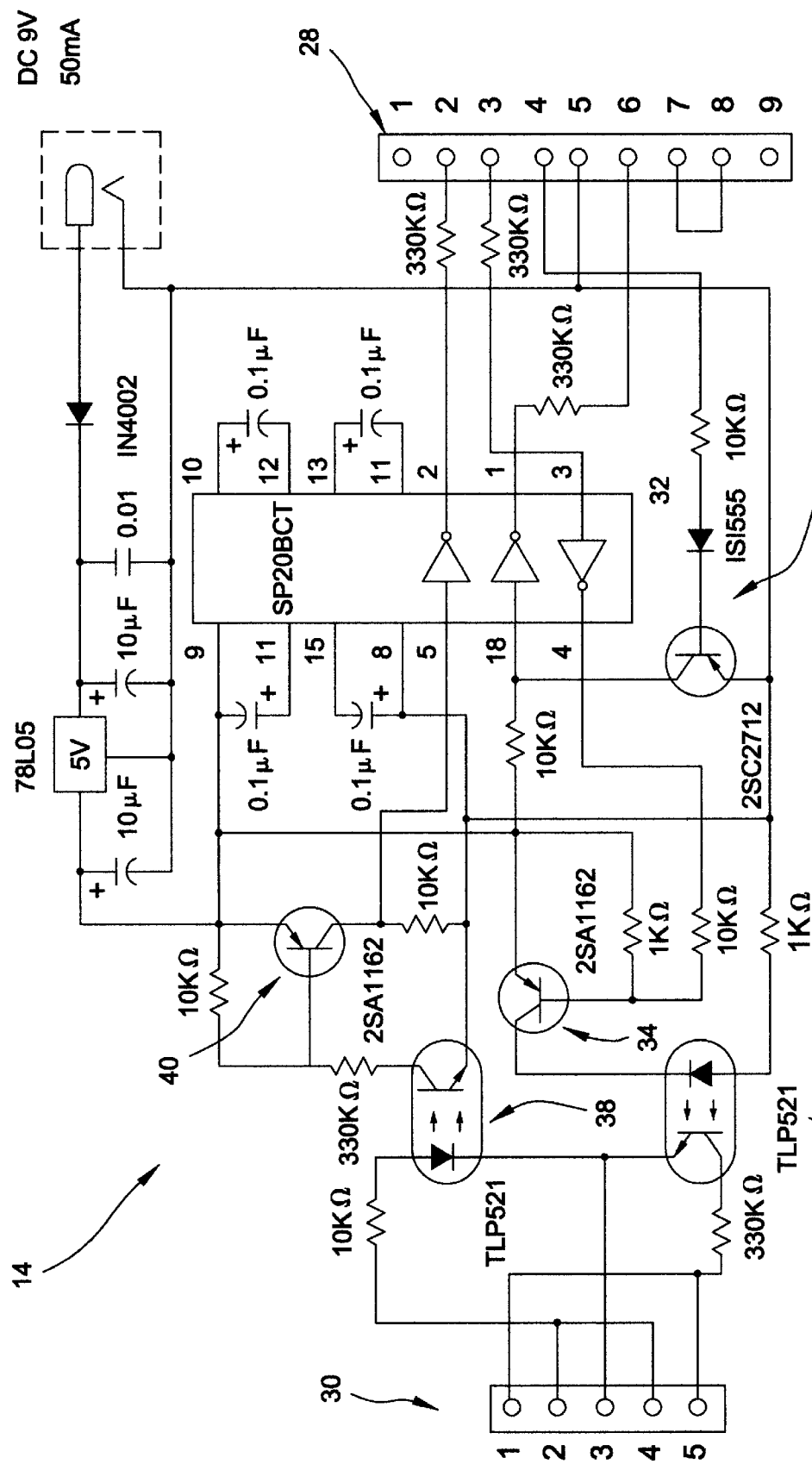
FIG. 3 is a schematic diagram of the interface circuit as shown in FIG. 1.

The interface circuit 14, shown in schematic diagram form in FIG. 3 and as a block diagram in FIG. 1, is operatively coupled to the RS-232 port of the personal computer 12. The interface circuit 14 is operatively coupled between the scanner 10 and the computer 12 allowing for data transfer and a communications link between the computer 12 and the memory of the scanner 10. A flat-type connector 16 is operatively coupled to the interface circuit 14 through a cable 15 which is comprised of five codes or wires. As will be explained later in more detail, the scanner 10 has a receptacle 22, FIG. 2, for receiving the connector 16. Hence, the data can be supplied from the external computer 12 to the scanner 10 through the interface circuit 14 and cable 15 to the connector 16 which is inserted into and connected to the receptacle 22, and vice versa.

The manner in which the connector 16 is inserted into and connected to the receptacle 22 of the scanner 10 is explained by referencing FIG. 2. The scanner 10 includes a housing 11 having a rear slot opening 18 through which the connector 16 can be inserted into and connected to the receptacle 22. The receptacle 22 is fixed on a surface of a printed circuit board 20. The connector 16 has a connecting portion 24 which is inserted into and received within the receptacle 22.

The connector 16 has two surfaces on the connecting portion 24, an upper surface and a lower surface. On each of the two surfaces of the connecting portion 24 of the connector 16, five conductors 26 are provided, respectively, which are arranged at equal intervals along the connecting portion 24. Therefore, there are five vertical pairs of the conductors 26 along the connecting portion 24 of the connector 16.

The individual conductors 26 of the respective vertical pairs of conductors are connected to each other. The individual vertical pairs of the conductors 26 are connected to the respective codes or wires of the cable 15. The receptacle 22 has five contacts which can be contacted simultaneously to the conductors 26 on the upper surface of the connector 16, respectively, and five contacts which can be contacted simultaneously to the conductors 26 on the lower surface of the connector 16, respectively. Similarly, the contacts of the respective vertical pair of the receptacle 22 are also connected to each other. Therefore, five output leads are provided from the receptacle 22.

FIG. 3 schematically illustrates the interface circuit 14 of FIG. 1. The interface circuit 14 is operatively coupled between the scanner 10 and the computer 12 allowing for data transfer and a communications link between the computer 12 and the memory of the scanner 10. The interface circuit 14 converts the data signals generated in the computer 12 from a signal level into electric pulse signals which are suitable to write a program into the memory of the scanner 10. Conversely, the interface circuit 14 is capable of converting the signal level of the data read out from the memory of the scanner 10 into electric pulse signals which are suitable to be received by the computer 12 through the interface circuit 14.

The interface circuit 14 includes a 9 pin connector 28 which is adapted to connect the RS-232 port of the personal computer 12 to the interface circuit 14. The interface circuit 14 also includes, a 5-pin output terminal 30 comprised of five pins (1–5) which are connected to the five vertical pairs of the conductors 26 of the connector 16, respectively, through the 5-code cable 15.

Reference numeral 32 identifies a conventional RS-232 transceiver. A transmitter data (TXD) signal from the RS-232 port of the personal computer 12 is coupled to pin 3 of the connector 28, and passes through a driver portion of the transceiver 32. The output of a TTL/CMOS level from the driver portion of the transceiver 32 is applied to a current converter circuit portion 34, comprising a transistor and a photo-coupler 36, to pins 1 and 5 of the output terminal 30.

Input data from the scanner 10 to the interface circuit 14 is applied to pins 2 and 4 of the output terminal 30 through a photo-coupler 38 and a current converter circuit portion 40 comprising a transistor, to a receiver portion of the RS-232 transceiver 32. The output from the receiver portion of the RS-232 transceiver 32 is applied to pin 2 of the connector 28 as a receiver data (RXD) signal to the computer 12 RS-232 port.

A feedback circuit 41 from pins 4 to 6 of the connector 28 enables the computer 12 to recognize the operating status of a utilization device, or to whether any utilization device is connected to the RS-232 port of the computer 12. Signals on pin 5 of the connector 28 and on pin 3 of the terminal 30 are ground (GRD) signals.

Figure 4:
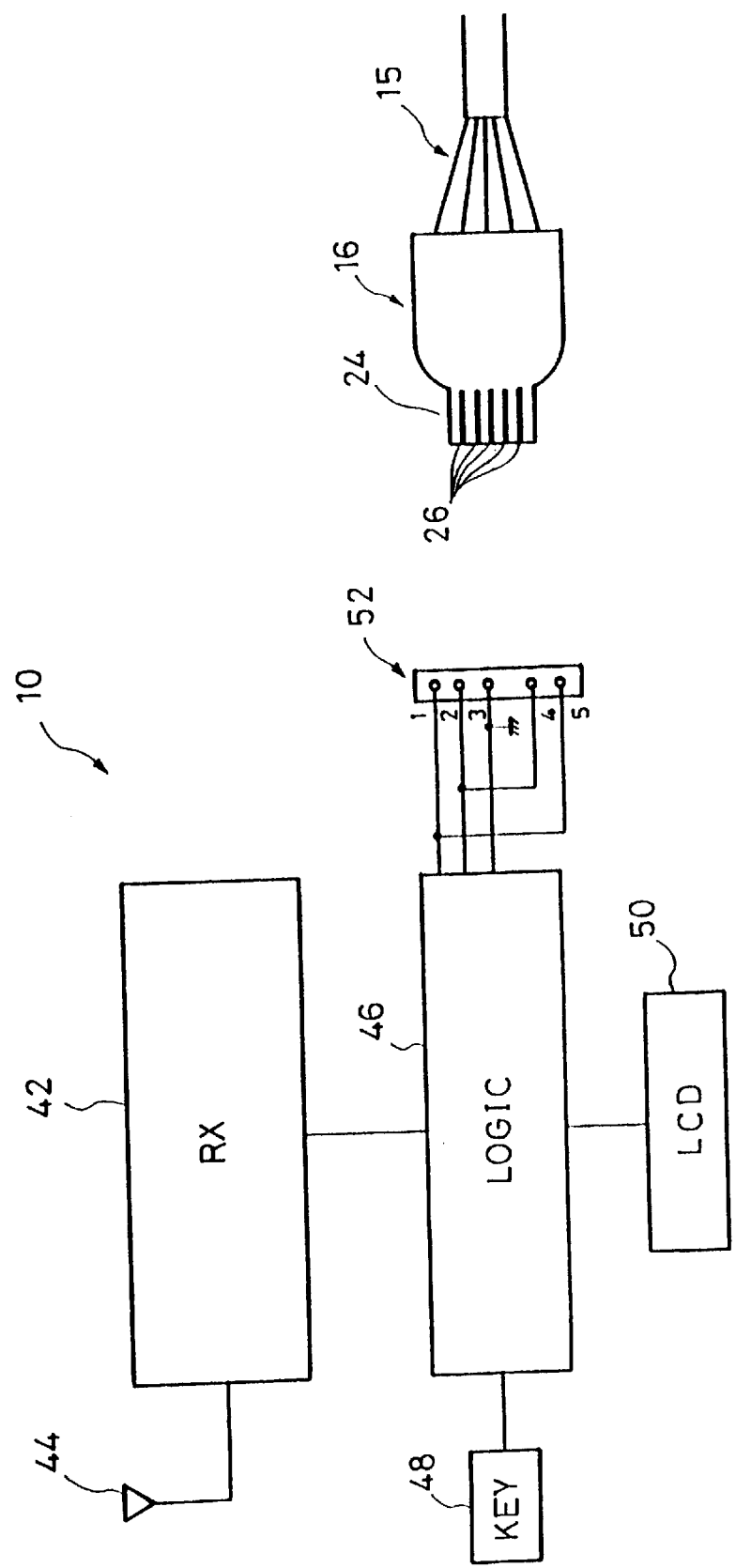
FIG. 4 is a schematic diagram of the scanner as shown in FIG. 1, as well as, the reversible connector in FIG. 2.

FIG. 4 illustrates, schematically, the interior circuit of the scanner 10, in conjunction with the connector 16 which is adapted to be inserted into and connected to the receptacle 22 of the scanner 10. The scanner 10 comprises a receiver circuit portion 42 connected to an antenna 44, a logic circuit portion 46 connected to a keyboard 48, and a liquid-crystal display (LCD) 50. The logic circuit portion 46 comprises a micro-computer which controls the operation of the receiver portion 42 in response to a key input from the keyboard 48, and supplies to the LCD display 50 a signal for displaying the operation of the scanner receiver portion 42. The logic circuit portion 46 provides various control signals to the scanner receiver portion 42, including a signal for activating circuits in the scanner 10 for scanner reception frequency bands, such as LOW, HIGH, and UHF, respectively, a signal for controlling the scanner 10 in response to the kind of modulation of the scanner reception signal, a signal for digitally controlling the frequency of a receiver local oscillator circuit so that the scanner 10 can tune appropriately to the frequency to be received, and a signal for controlling the mute operation of the scanner 10, and the like.

The connector 16, to which the cable 15 is connected, can be inserted into and connected to the receptacle 22 in a relatively simple manner. For example, when the connector 16 is intended to be inserted into the receptacle 22, there is no need to pay special attention to the front and back surfaces of the connector 16. The connector 16 is merely inserted into the slot opening 18 in order to be connected to the receptacle 22, allowing the connector 16 to have a reversible function or characteristic. As explained above in relation to FIG. 2, this characteristic feature is partially achieved by providing, on the front and back surfaces of the connecting portion 24, similar vertical conductor 26 arrangements, in addition to providing, in the receptacle 22, two vertical contact arrangements, one vertical contact arrangement contacting the front surface conductor 26 arrangement of the connecting portion 24 and a second vertical contact arrangement contacting the back surface conductor 26 arrangement of the connecting portion 24. The combined features of the conductor 26 arrangement of the connecting portion 24, in conjunction with the contact arrangements within the receptacle 22, allow for the connector 16 to have a reversible function or characteristic.

Further, the individual conductors 26 of the respective vertical pair of conductors 26 of the connector 16 are connected to each other, wherein five pairs of vertical conductors 26 are produced. The five pairs of vertical conductors 26 are connected to the five codes or wires of the cable 15, respectively. Similarly, the vertical pair contacts, located in receptacle 22, are connected to each other. The vertical pair contacts become operatively coupled to the respective vertical pair of conductors 26 of the connector 16, when the connector 16 is inserted into the receptacle 22.

As mentioned in relation to FIG. 3, the vertical pair conductors 26 are positioned at equal intervals along the connecting portion 24. Similarly, the transmitter data (TXD) pins 1–5 of the output terminal 30, located in the interface circuit 14, are positioned at equal intervals along the output terminal 30. Specifically, the transmitter data (TXD) pins 1 and 5 of the output terminal 30 are coupled to the vertical pair of conductors 26 located at opposite ends of the connecting portion 24, the ground (GRD) center pin 3 of the output terminal 30 is coupled to the vertical pair of conductors 26 located at the center of the connecting portion 24, and receiver data (RXD) pins 2 and 4 of the output terminal 30 are coupled to the vertical pair of conductors 26 located between the vertical pair of conductors 26, located at the opposite ends of the connecting portion 24, and the vertical conductor pair 26, located at the center of the connecting portion 24, respectively. This connection relationship is the same as in the vertical five-contact arrangements of the receptacle 22. Vertical contact pairs of the receptacle 22 are connected to a terminal 52 which is coupled to the logic circuit portion 46 of the scanner 10. Therefore, the pins 1, 2, 3, 4, and 5 of the terminal 30 in FIG. 3, located in the interface circuit 14, are connected to the pins 1, 2, 3, 4, and 5 of the terminal 52 of the scanner 10 in FIG. 4, in this order or in reverse order. The GRD pins 3 of the both terminals 30 and 54 are always connected to each other in spite of any front or back connection of the connector 16 to the receptacle 22.

As indicated in FIG. 4, the terminal 52 of the scanner 10 is connected to the micro-computer in the logic circuit portion 46. The transmitter data (TXD) signals at the pins 1 and 5, of the terminals 30 and 52 from the personal computer 12, are applied together with the ground (GRD) signal at the pins 3 of the terminals 30 and 52, to write data relating to the reception frequency parameters for the scanner 10 into the micro-computer memory, such as PROM. The receiver data (RXD) signal at the pins 2 and 4, of the terminals 52 and 30, from the micro-computer in the logic circuit portion 46 which identifies the stored data contents in the PROM, is transmitted through the interface circuit 14 to the personal computer 12.

In one embodiment of this invention, a communication protocol of Asynchronous, Baud Rate/300-19200 Baud, 8 bit Data, Parity/None and 1 Stop bit is used between the personal computer 12 and the scanner 10. A program which runs on the personal computer 12 causes the personal computer 12 to program, download and upload the reception frequency parameters for a desired channel of the memory of the scanner 10, that is a firmware memory. The program can setup a frequency, a kind of modulation (AM, FM, WFM, etc.), a delay and lock-out for a respective channel, and can transmit the date to write into the scanner memory. It is also possible to read out the parameters which have already been set from a desired channel, etc. for editing.

In the illustrated embodiment of this invention, the invention was described as one in which the receiver data (RXD) signal is provided from the memory of the scanner 10 to the personal computer 12. However, it is not essential in this invention. In that case, the pins 2 and 4 of the terminal 52 and 30, and related parts may simply be omitted.

While a preferred embodiment of the present invention is shown and described, it is envisioned that those skilled in the art may devise various modifications of the present invention without departing from the spirit and scope of the appended claims.

The invention claimed is:

1. An apparatus for facilitating the transfer of signals from a computer for the external setting of reception frequency parameters and other operating conditions of a radio receiver having a memory which is programmable, said apparatus comprising:

a receptacle on said radio receiver;

an interface circuit operatively coupled to said computer;

a flat-type connector extending from said interface circuit, said flat-type connector being configured to be operatively coupled to said receptacle of said radio receiver thereby enabling said computer to communicate with said radio receiver memory through said flat-type connector;

said interface circuit operatively coupled between said computer and said flat-type connector, said interface circuit enabling data transfer and communication between said computer and said memory of said radio receiver through said flat-type connector.

2. The apparatus defined in claim 1, wherein said radio receiver is a scanner, said scanner being capable of scanning a plurality of frequencies which have been set into said scanner.

3. The apparatus defined in claim 1, wherein said interface circuit further includes a feedback circuit, said feedback circuit providing information to said computer as to the status of a utilization device coupled to said computer.

4. The apparatus defined in claim 1, wherein said data set in said memory of said radio receiver can be read out of said memory into said computer in order to edit said data.

5. The apparatus defined in claim 1, wherein said interface circuit further includes a feedback circuit, said feedback circuit providing information to said computer as to whether a utilization device is coupled to said computer.

6. An apparatus for facilitating the transfer of signals from a computer for the external setting of reception frequency parameters and other operating conditions of a radio receiver having a memory which is programmable according to data in the form of an electric pulse signal, said apparatus comprising:

an interface circuit operatively coupled to said computer, said interface circuit converting respective signal levels of said data transmitted from said computer to the signal level of said electric pulse signal which is suitable to write a program to said memory of said radio receiver;

a receptacle on said radio receiver; and a connector extending from said interface circuit, said connector being adapted to be operatively coupled to said receptacle of said radio receiver enabling said computer to communicate with said radio receiver memory through said interface circuit, said connector having pairs of connector conductors connected to each other, said receptacle having contacts adapted to contact said connector conductors, said contacts of said receptacle and said connector conductors of said connector being configured in a manner wherein said connector can be inserted into and connected to said receptacle in a reversible manner.

7. An apparatus for facilitating the transfer of signals from a computer for the external setting of reception frequency parameters and other operating conditions of a radio receiver having a memory which is programmable according to data in the form of an electric pulse signal, said apparatus comprising:

an interface circuit operatively coupled to said computer, said interface circuit converting respective signal levels of said data transmitted from said computer to the signal level of said electric pulse signal which is suitable to write a program to said memory of said radio receiver;

a receptacle on said radio receiver; and a connector extending from said interface circuit, said connector being adapted to be operatively coupled to said receptacle of said radio receiver enabling said computer to communicate with said radio receiver memory through said interface circuit, said connector having respective front and back surface portions on which pairs of vertical connector conductors are provided, wherein individual vertical conductors of said pairs of vertical connector conductors are mutually connected to each other, said individual vertical conductors on said respective surface portions of said connector being arranged so that said pair of vertical conductors are positioned on opposite sides of a center conductor, said receptacle having contacts adapted to simultaneously contact said conductors on either of said surface portion of said connector, respectively, said contacts of the receptacle being connected in the same manner as said pairs of vertical connector conductors of said connector, wherein said connector can be inserted into and connected to said receptacle in a reversible manner.

8. The apparatus defined in claim 7, wherein said connector comprises a flat-type connector.

9. The apparatus defined in claim 7, wherein said radio receiver is a scanner, said scanner being capable of scanning a plurality of frequencies which have been set into said scanner.

10. The apparatus defined in claim 7, wherein said interface circuit further includes a feedback circuit, said feedback circuit providing information to said computer as to the status of a utilization device coupled to said computer.

11. The apparatus defined in claim 7, wherein said program set in said memory of said radio receiver can be read out of said memory into said computer in order to edit said program.

12. The apparatus defined in claim 7, wherein said interface circuit further includes a feedback circuit, said feedback circuit providing information to said computer as to whether a utilization device is coupled to said computer.

13. The apparatus defined in claim 7, wherein said receptacle has upper contacts adapted to simultaneously contact said conductors on said front surface portion of said connector, respectively, and lower contacts adapted to simultaneously contact said conductors on said back surface portion of said connector, respectively.

14. An apparatus for facilitating the transfer of signals from a computer for the external setting of reception frequency parameters and other operating conditions of a radio receiver having a memory which is programmable according to data in the form of an electric pulse signal, said apparatus comprising:

an interface circuit operatively coupled to said computer, said interface circuit converting respective signal levels of said data transmitted from said computer into the signal level of said electric pulse signal which is suitable to write a program to said memory of said radio receiver, said interface circuit converting the signal level of the data read out from said memory to the level of the electric pulse which is suitable to be received by said personal computer through said interface circuit;

a receptacle on said radio receiver; and a connector extending from said interface circuit, said connector being adapted to be operatively coupled to said receptacle of said radio receiver enabling said computer to communicate with said radio receiver memory through said interface circuit, said connector having respective front and back surface portions on which pairs of vertical connector conductors are provided, wherein individual vertical conductors of said pairs of vertical connector conductors are mutually connected to each other, said individual vertical conductors on the respective surface portions of said connector being arranged so that a first pair of said vertical connector conductors are positioned at opposite sides of a center conductor, and a second pair of said vertical connector conductors are positioned between said first pair of vertical connector conductors and said center conductor, respectively, said receptacle having contacts adapted to simultaneously contact said conductors on either of said surface portions of said connector, respectively, said contacts of the receptacle being connected in the same manner as said pairs of vertical connector conductors of said connector, wherein said connector can be operatively coupled to said receptacle in a reversible manner.

15. The apparatus defined in claim 14, wherein said receptacle has upper contacts adapted to simultaneously contact said conductors on said front surface portion of said connector, respectively, and lower contacts adapted to simultaneously contact said conductors on said back surface portion of said connector, respectively.

16. The apparatus defined in claim 14, wherein said connector comprises a flat-type connector.

17. The apparatus defined in claim 14, wherein said radio receiver is a scanner, said scanner being capable of scanning a plurality of frequencies which have been set into said scanner.

18. The apparatus defined in claim 14, wherein said interface circuit further includes a feedback circuit, said feedback circuit providing information to said computer as to the status of a utilization device connected to said computer.

19. The apparatus defined in claim 14, wherein said program set in said memory of said radio receiver can be read out of said memory into said computer in order to edit said program.

20. The apparatus defined in claim 14, wherein said interface circuit further includes a feedback circuit, said feedback circuit providing information to said computer as to whether a utilization device is connected to said computer.

* * * * *